(12) United States Patent
Nuetzel et al.

(10) Patent No.: US 9,035,540 B2
(45) Date of Patent: May 19, 2015

(54) ELECTRON MULTIPLIER DETECTOR FORMED FROM A HIGHLY DOPED NANODIAMOND LAYER

(75) Inventors: Gert Nuetzel, RV Delft (NL); Pascal Lavoute, Brive-la-Gaillarde (FR); Richard B. Jackman, Hertfordshire (GB)

(73) Assignee: PHOTONIS FRANCE, Brive (FR)

( * ) Notice: Subject to any disclaimer, the term of this patent is extended or adjusted under 35 U.S.C. 154(b) by 322 days.

(21) Appl. No.: 13/805,094

(22) PCT Filed: Jun. 17, 2011

(86) PCT No.: PCT/EP2011/060076
§ 371 (c)(1),
(2), (4) Date: Mar. 1, 2013

(87) PCT Pub. No.: WO2011/157810
PCT Pub. Date: Dec. 22, 2011

(65) Prior Publication Data
US 2013/0146778 A1    Jun. 13, 2013

(30) Foreign Application Priority Data
Jun. 18, 2010  (FR) ...................................... 10 54858

(51) Int. Cl.
*H01J 43/10*     (2006.01)
*G01T 1/24*      (2006.01)
(Continued)

(52) U.S. Cl.
CPC . *G01T 1/247* (2013.01); *H01J 1/32* (2013.01); *H01J 29/023* (2013.01); *H01J 31/48* (2013.01);
(Continued)

(58) Field of Classification Search
CPC .......... H01J 43/02; H01J 43/04; H01J 43/246
USPC ................ 313/103 R, 103 CM, 104; 250/207
See application file for complete search history.

(56) References Cited

U.S. PATENT DOCUMENTS 4,419,603 A    12/1983  Nussli et al.
5,680,008 A    10/1997  Brandes et al.
(Continued)

FOREIGN PATENT DOCUMENTS

EP    0 841 684 A2    5/1998
EP    0 908 917 A2    4/1999
GB    2 081 006 A     2/1982

OTHER PUBLICATIONS

W. Gajewski, et al., "Electronic and optical properties of boron-doped nanocrystalline diamond films", Physical Review B, 79, 045206, 2009, 14 pages.

(Continued)

*Primary Examiner* — Karabi Guharay
(74) *Attorney, Agent, or Firm* — Oblon, McClelland, Maier & Neustadt, L.L.P.

(57) ABSTRACT

A system for detecting electromagnetic radiation or an ion flow, including an input device for receiving the electronic radiation or the ion flow and emitting primary electrons in response, a multiplier of electrons in transmission, for receiving the primary electrons and emitting secondary electrons in response, and an output device for receiving the secondary electrons and emitting an output signal in response. The electron multiplier includes at least one nanocrystalline diamond layer doped with boron in a concentration of higher than $5 \cdot 10^{19}$ cm$^{-3}$.

16 Claims, 6 Drawing Sheets

(51) Int. Cl.
    *H01J 1/32*    (2006.01)
    *H01J 29/02*   (2006.01)
    *H01J 31/48*   (2006.01)
    *H01J 31/49*   (2006.01)
    *H01J 31/50*   (2006.01)
    *H01J 43/22*   (2006.01)
    *H01J 43/24*   (2006.01)
    *H01J 43/04*   (2006.01)
    *B82Y 15/00*   (2011.01)

(52) U.S. Cl.
    CPC ............... *H01J 31/49* (2013.01); *H01J 31/506* (2013.01); *H01J 43/22* (2013.01); *H01J 43/246* (2013.01); *H01J 2231/5001* (2013.01); *H01J 2231/50047* (2013.01); *B82Y 15/00* (2013.01); *H01J 43/04* (2013.01)

(56) References Cited

U.S. PATENT DOCUMENTS

| | | |
|---|---|---|
| 5,986,387 A | 11/1999 | Niigaki et al. |
| 6,657,385 B2 | 12/2003 | Tomasetti et al. |
| 2002/0041154 A1 | 4/2002 | Tomasetti et al. |
| 2013/0161535 A1 | 6/2013 | Nuetzel et al. |

OTHER PUBLICATIONS

Jan Isberg, et al., "High Carrier Mobility in Single-Crystal Plasma-Deposited Diamond", Science, 297, 2002, pp. 1670-1672 with cover page.

9,035,540 B2

ELECTRON MULTIPLIER DETECTOR FORMED FROM A HIGHLY DOPED NANODIAMOND LAYER

TECHNICAL FIELD

The present invention relates to the general field of systems for detecting electromagnetic radiation or ion flow comprising a multiplier of electrons in transmission. By way of example, photomultiplier tubes, image intensifier tubes, or instead, ion detection tubes may be cited.

Multiplier of electrons in transmission is taken to mean a device capable of receiving incident electrons and emitting so-called secondary electrons in response in high numbers. The incident electrons impact the device on a receiving face and the secondary electrons are emitted from an opposite emitting face.

PRIOR ART

Conventionally, a system for detecting electromagnetic radiation or ion flow comprises an input device for receiving an electromagnetic radiation or an ion flow and emitting in response a flux of so-called primary electrons, a multiplier of electrons potentially in transmission for receiving the primary electrons and emitting so-called secondary electrons in response, and an output device for receiving the secondary electrons and emitting an output signal in response, these different elements being assembled in a casing. The casing, closed at two ends by the input device and the output device, delimits an interior chamber under vacuum.

As an illustration, in the case of an image intensifier tube, the input device comprises a photocathode that receives the incident photons coming from the exterior environment to convert them into photoelectrons according to a pattern corresponding to the image of the environment observed. The electron multiplier amplifies the photoelectrons, which are then transformed by the output device into a luminous signal intensified by means of a phosphor screen, a CMOS sensor or a CCD sensor.

The electron multiplier may comprise a layer of crystalline semiconductor material, for example polycrystalline diamond (PCD). Diamond has in fact a low or negative electron affinity, as well as a high secondary emission output.

An image intensifier tube comprising such a semiconductor diamond layer is in particular described in U.S. Pat. No. 6,657,385. This document illustrates an example of prior art to the present application. FIG. 8 of this patent is reproduced hereafter.

In FIG. 1 is represented in part such an image intensifier tube seen in section. The section plane is parallel to an axis Z known as tube axis. An orthogonal mark (R,Z) in cylindrical coordinates is represented where R is the radial direction of the tube A01, and Z is the axial direction of the tube which may also substantially be assimilated to the general direction of travel of the electrons.

General direction of propagation of the electrons is taken to mean the direction of travel of the electrons between the input device and the output device.

Following the direction Z, the tube A01 comprises an input window A11, through which the luminous signal of the image to be intensified enters into the tube, and a photocathode A12 deposited on the internal face of the input window A11.

The tube A01 then comprises an electron multiplier, which comprises a polycrystalline semiconductor diamond layer A21, and a microchannel plate (MCP) A22.

Finally, the output device comprises a phosphor screen A32 deposited on the internal face A31 of an output window.

The photocathode A12, the upstream A21E and downstream A21S faces of the diamond layer A21, the upstream A22E and downstream A22S faces of the MCP A22, as well as the phosphor screen A32 are taken to different electric potentials so as to create electric fields that orient and accelerate the electrons.

As shown in FIG. 1, the tube body A02 is formed of a plurality of metal bands ensuring the voltage supply of the different electrodes on which are brazed in a sealed manner rings made of insulating material.

The polycrystalline semiconductor diamond layer A21 thus makes it possible to generate secondary electrons when incident electrons penetrate inside the layer by passing through its upstream receiving face A21E.

In fact, when incident electrons penetrate into the diamond layer A21, electron-hole pairs are created, the electrons of which form secondary electrons. To enable the latter to reach the downstream emitting face A21S, an electric field is imposed inside the diamond layer A21, through electrodes arranged on its receiving face A21E and its emitting face A21S.

Furthermore, to obtain a transport of the secondary quasi-ballistic electrons inside the diamond layer and thereby reduce diffusion losses, the electric field imposed is of the order of 1000 kV/cm, for a diamond layer of thickness of the order of several tenths of microns to several microns.

The polycrystalline diamond layer may also have an orientation periodicity (100), such that the orientation of the grain joints corresponds substantially to the direction of travel of the electrons, in other words the Z axis. The influence of the grain joints on the transport of the secondary electrons is thereby reduced. In fact, the grain joints form diffusion zones which perturb the transport of the electrons and reduce the secondary emission output.

In other words, the transport of the secondary electrons is ensured essentially in the form of drift current, due to the high intensity electric field imposed between the upstream and downstream faces of the diamond layer, whereas the diffusion current is rendered negligible.

However, a detection system in which the electron multiplier comprises a polycrystalline diamond layer as described previously has a certain number of drawbacks.

In fact, it is necessary to generate an electric field of high intensity inside the diamond layer to ensure the transport of the secondary electrons up to the downstream emitting face of the diamond layer, and to obtain an acceptable secondary emission output.

This entails providing polarisation electrodes arranged on each of the upstream and downstream faces of the diamond layer for the purpose of generating the electric field. Said electrodes are each formed of a metal layer deposited on said upstream and downstream faces. However, said polarisation electrodes reduce the surface for receiving incident electrons from the upstream face as well as the emission surface of the secondary electrons from the downstream face, which results in a net reduction in the transmission of electrons, of the order of 30 to 50%.

In addition, to avoid any breakdown phenomenon, a minimum distance has to be imposed between the diamond layer and the elements situated upstream and downstream, such as the MCP and the phosphor screen.

Furthermore, the tube body needs to comprise metal bands specially dedicated to the voltage supply of the two polarisation electrodes. Said metal bands are spaced apart from each other through electrically insulating spacers.

These different aspects entail the image intensifier tube having a particularly high weight and length.

In addition, the method for manufacturing the tube is rendered particularly long and complex, which leads to a high cost of the image intensifier tube.

Furthermore, to increase the secondary emission output, it is important that the thickness of the diamond layer is sufficiently low so that the secondary electrons are created near to the emitting face. To this end, it is important that the thickness of the diamond layer is slightly greater than the penetration length of the incident electrons, but also that this thickness if of the same order as the average diffusion length of the secondary electrons, i.e. several tens of microns.

However, a diamond layer of such a thickness has low mechanical strength, which necessitates using means for maintaining and reinforcing the diamond layer.

DESCRIPTION OF THE INVENTION

The main aim of the invention is to present a system for detecting electromagnetic radiation or ion flow, comprising a multiplier of electrons in transmission comprising a polycrystalline diamond layer, remedying at least in part the aforementioned drawbacks.

To this end, the subject matter of the invention is a system for detecting an electromagnetic radiation or an ion flow comprising:
- an input device, for receiving the electronic radiation or the ion flow and emitting so-called primary electrons in response,
- a multiplier of electrons in transmission for receiving the primary electrons and emitting so-called secondary electrons in response, and
- an output device, for receiving the secondary electrons and emitting an output signal in response.

According to the invention, said electron multiplier comprises at least one nanocrystalline diamond layer doped with boron in a concentration of higher than $5.10^{19}$ cm$^{-3}$.

Nanocrystalline diamond (NCD) layer is taken to mean a polycrystalline diamond (PCD) layer, the average grain size of which is comprised between several nanometers and several hundreds of nanometers, for example between 5 nm and 500 nm. The average grain size may be of the order of 50 nm.

Thus, unlike the PCD diamond layer as described with reference to the example of the prior art, the transport of the secondary electrons inside the B-NCD diamond layer according to the invention occurs essentially in the form of a diffusion current and not in the form of a drift current.

In fact, the nanocrystalline structure of the B-NCD diamond layer as well as the high concentration of boron atoms make the diffusion of secondary electrons particularly important and reduce their mobility.

This type of transport of secondary electrons in the B-NCD diamond layer according to the invention then has several advantages.

It is thus not necessary to impose an electric field within the B-NCD nanocrystalline diamond layer to achieve the transport of the secondary electrons, in so far as this is ensured by diffusion of the electrons. The receiving and emitting faces of the B-NCD diamond layer may thus not be metallised to form the polarisation electrodes necessary for the generation of the electric field dedicated to the B-NCD diamond layer.

Also, unlike the prior art, the incident electrons received and the secondary electrons emitted are no longer captured by the polarisation electrodes arranged on the faces of the B-NCD diamond layer. The rate of transmission of the electrons is thereby maintained.

Advantageously, said B-NCD nanocrystalline diamond layer has a boron doping concentration higher than $2.10^{20}$ cm$^{-3}$, for example of the order of $10^{21}$ cm$^{-3}$. The resistivity of the material is in fact low, since it is around 0.8 Ωcm for a boron concentration of $2.10^{20}$ cm$^{-3}$, and reduces to $10^{-2}$ Ωcm for a concentration of $3.10^{21}$ cm$^{-3}$.

The thickness of the B-NCD nanocrystalline diamond layer may be comprised between 0.1 µm and 10 µm. It is advantageously higher than the penetration length of the incident electrons, for example from two to ten times the penetration length. Penetration length of the incident electrons is taken to mean the maximum average distance reached by the incident electrons that penetrate into the B-NCD diamond layer, measured from the upstream receiving face thereof.

Said B-NCD nanocrystalline diamond layer is advantageously formed by chemical vapour deposition, according to techniques known to those skilled in the art, and doped with boron in a concentration of higher than $5.10^{19}$ cm$^{-3}$. It is thus possible to obtain diamond, the average grain size of which is comprised between several nanometers and several hundreds of nanometers. Grain joints, stacking faults and dislocations are present. Thus, the B-NCD nanocrystalline diamond layer has a very high density of diffusion zones. This increases the value of the diffusion constant of the secondary electrons. In addition, the diamond layer has a high density and thus a better mechanical strength.

Furthermore, the B-NCD nanocrystalline diamond layer may comprise, arranged on its upstream face for receiving incident electrons, an electrode for collecting holes intended to be taken to an electrical potential. Said collection electrode, when it is taken to an electrical potential, forms a reservoir of electrons allowing the recombination of the additional holes generated by the incident electrons. Thus, the overall electrical charge of the B-NCD nanocrystalline diamond layer remains substantially constant.

Said collection electrode may be arranged at the edge of the upstream face or may extend substantially over the entire upstream face of the B-NCD nanocrystalline diamond layer.

An electric field may be present inside the B-NCD nanocrystalline diamond layer, and is less than or equal to 10 kV/cm, for example 10 kV/cm, 5 kV/cm, 2 kV/cm, 1 kV/cm or 0.5 kV/cm. Said electric field is then insufficient to generate a drift current of the secondary electrons in the nanocrystalline diamond layer. The diffusion current of the secondary electrons in the B-NCD nanocrystalline diamond layer is then preponderant. It may thus be considered, as a first approximation, that the B-NCD nanocrystalline diamond layer is substantially equipotential at all points of its volume.

Furthermore, the downstream face for emitting secondary electrons of the B-NCD nanocrystalline diamond layer may be treated with hydrogen or caesium to reduce its electron affinity. Thus, the secondary electrons that reach the downstream emission face of the B-NCD nanocrystalline diamond layer are naturally extracted from the diamond layer.

Finally, it should be noted that, in so far as it is not necessary to impose an electric field between the two faces of the B-NCD nanocrystalline diamond layer, the casing wherein is assembled the B-NCD nanocrystalline diamond layer does not have to comprise metal parts intended to take to a determined potential electrodes arranged on said faces of the B-NCD nanocrystalline diamond layer. The casing may nevertheless comprise a metal part electrically connected to the collection electrode of the upstream face of the B-NCD nanocrystalline diamond layer, to take said electrode to a desired potential.

Furthermore, the B-NCD nanocrystalline diamond layer may be arranged in the detection system at any distance whatsoever from the upstream or downstream element along the general direction of propagation of the electrons.

Thus, in the case where the electron multiplier comprises a MCP arranged downstream of the B-NCD nanocrystalline diamond layer along the general direction of propagation of the electrons, the nanocrystalline diamond layer may be arranged in contact with the MCP. More precisely, the downstream face for emitting secondary electrons from the nanocrystalline diamond layer is in contact with the upstream receiving face of the MCP.

Alternatively, the B-NCD nanocrystalline diamond layer may be arranged at a distance from the MCP comprised between several microns and several hundreds of microns, for example between 5 μm and 500 μm.

Because of the contact or the short distance between the B-NCD nanocrystalline diamond layer and the MCP, it is not necessary to generate an electric field between the diamond layer and the MCP.

It should be noted that it is not necessary either to provide for a protection layer arranged on the MCP, for example a layer of aluminium. A layer of aluminium is, according to the prior art, normally arranged on the upstream face of the MCP to protect the input device from the potential impact thereon of positive ions.

In fact, in the case of an input device comprising a photocathode made of GaAs, as is the case in so-called third generation image intensifier tubes, the physical properties of the photocathode may be particularly degraded by the impact of positive ions. Said positive ions normally come from the MCP when it is subjected to a flux of incident electrons and emits secondary electrons in response. The protection layer then makes it possible to avoid the positive ions impacting the photocathode. However, this protection layer has the disadvantage of reducing by 30% to 50% the transmission of the incident electrons to the MCP.

Unlike the prior art, the B-NCD nanocrystalline diamond layer arranged between the input device and the MCP intercepts the positive ions emitted by the MCP in the direction of the input device. It is thus protected from the impact of positive ions, and its lifetime is thereby preserved. In addition, not only the transmission of the incident electrons to the MCP is not reduced, but it is quite the contrary increased due to the high gain of the B-NCD nanocrystalline diamond layer.

In the same way, the B-NCD nanocrystalline diamond layer may be arranged in contact with the output device or at short distance therefrom.

The output device comprises in fact a face for receiving secondary electrons. The B-NCD nanocrystalline diamond layer may thus be arranged such that its downstream emitting face is in contact with the receiving face of the output device.

Alternatively, the B-NCD nanocrystalline diamond layer may be arranged at a distance from the output device comprised between several microns and several hundreds of microns, for example between 5 μm and 500 μm.

Here as well, due to the contact with or the short distance between the B-NCD nanocrystalline diamond layer and the output device, it is not necessary to generate an electric field between the B-NCD nanocrystalline diamond layer and the output device.

The electron multiplier may comprise several B-NCD nanocrystalline diamond layers according to the invention. Said layers are arranged one on the other along the general direction of propagation of the electrons, and are spaced apart from each other.

Thus, the detection system may comprise a first B-NCD nanocrystalline diamond layer in contact with a MCP situated downstream thereof, and a second B-NCD nanocrystalline diamond layer in contact with the output device, as described previously.

Finally, it should be noted that the casing of the detection system comprises fewer parts to assemble than that of the prior art cited previously. The risks of a sealing defect between the parts forming the casing are then reduced. In addition, the casing is shorter and lighter, which meets the normal constraints of use of detection systems such as image intensifier tubes, photomultiplier tubes and ion flow detection tubes.

The detection system according to the invention may be an image intensifier tube. The output device may then comprise a phosphor screen, a CCD sensor or a CMOS sensor.

The detection system according to the invention may be a photomultiplier tube. The output device may then comprise at least one anode.

In these two cases, the input device may comprise a photocathode formed of $SbK_2Cs$ or GaAs.

The detection system according to the invention may be a tube for detecting an ion flow. The input device is then sensitive to said ion flow and emits primary electrons in response. The output device may comprise at least one anode.

Other advantages and characteristics of the invention will become clear from the non-limiting detailed description below.

BRIEF DESCRIPTION OF DRAWINGS

Embodiments of the invention will now be described, by way of non-limiting examples, and by referring to the appended drawings, in which.

DETAILED DESCRIPTION OF A PREFERRED EMBODIMENT

The detection system according to the invention described in detail hereafter is an image intensifier tube. However, it may also relate to a photomultiplier tube or an ion flow detection tube.

Figure 1:
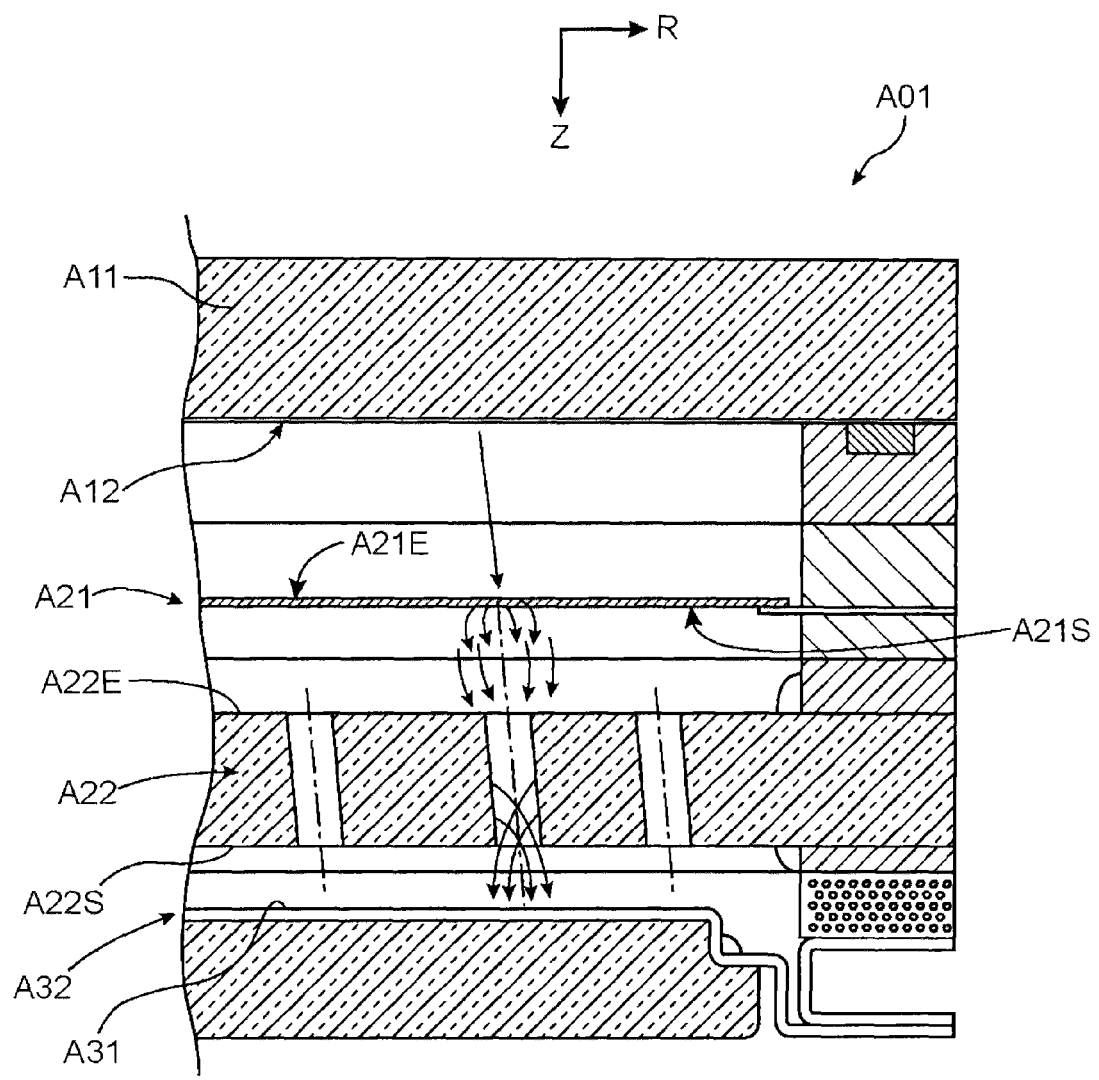
FIG. 1, already described, is a partial longitudinal section view of an image intensifier tube according to an example of the prior art.
Figure 2:
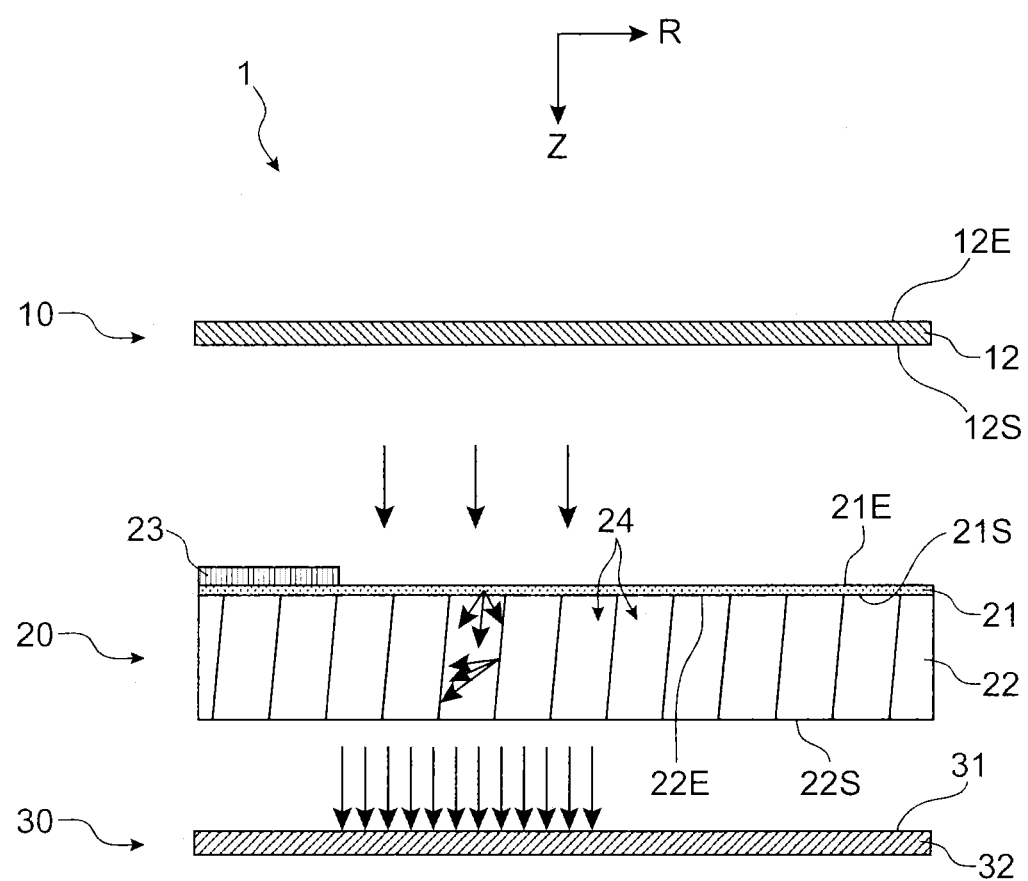
FIG. 2 is a schematic longitudinal section view of a detection system according to the invention, wherein a nanocrystalline diamond layer is arranged in contact with a microchannel plate.

FIG. 2 illustrates partially and in a schematic manner an image intensifier tube according to a first embodiment of the invention.

It should be noted that the scales are not respected in order to favour the clarity of the drawing.

Throughout the description that follows, an orthonormal mark (R,Z) in cylindrical coordinates is used where R is the radial direction of the tube and Z is the axial direction of the tube, which may also be substantially assimilated with the general direction of propagation of the electrons.

Furthermore, the terms "upstream" and "downstream" used hereafter should be understood herein in terms of orientation along the direction Z of the mark (R,Z).

In FIG. 2 is represented an image intensifier tube 1 according to the first embodiment of the invention. The tube 1 has a substantially cylindrical or tubular shape along the Z axis. However, the tube 1 may also have a square, rectangular, hexagonal section shape, or any other shape.

The tube 1 comprises three main elements arranged along the direction Z, in other words an input device 10, an electron multiplier 20 and an output device 30. The tube 1 also comprises a tube body (not represented) the function of which is to ensure the mechanical strength of the three elements 10, 20, 30 cited previously, to define in cooperation with the elements 10 and 30 a sealed chamber, and to enable the voltage supply of the different electrodes which will be described hereafter. The three elements 10, 20, 30 are substantially aligned along the axis of the tube Z.

The electron multiplier 20 comprises a nanocrystalline diamond layer 21 doped with boron (B-NCD) in a concentration of higher than $5.10^{19}$ cm$^{-3}$, and a microchannel plate (MCP) 22. According to the first embodiment of the invention, the B-NCD diamond layer 21 is arranged in contact with the MCP 22.

The input device 10 comprises an input window (not represented) through which arrives in the tube 1 the photons to be intensified emitted by an environment exterior to the tube 1. The transparent input window, for example made of glass, may be replaced by a fibre optic. The input window comprises an internal surface on which is deposited a photoemissive layer of a photocathode 12. The photocathode comprises an input surface 12E in contact with the internal surface of the input window, and an output surface 12S opposite to the input surface 12E along the direction Z. When the incident photons impact on the input surface 12E of the photoemitting layer, by photoelectric effect, photoelectrons are emitted by the output surface 12S of the photoemitting layer, in the direction of the electron multiplier 20.

The electron multiplier 20 is arranged between the photocathode 12 and the output device 30, along the Z axis of the tube. It receives the primary electrons emitted by the photocathode 12 and emits so-called secondary electrons in response in the direction of the output device substantially along the Z axis.

The electron multiplier 20 comprises the nanocrystalline diamond layer 21 doped with boron (B-NCD) and the microchannel plate (MCP) 22, said elements each being assembled to the tube body.

The B-NCD diamond layer has a boron concentration of higher than $5.10^{19}$ cm$^{-3}$. Thus, the boron atoms introduced into the B-NCD diamond layer are impurities which contribute to the charge carrier density. The charge carriers are here holes in so far as these atoms are of acceptor type.

Preferably, the concentration is higher than $2.10^{20}$ cm$^{-3}$, for example $10^{21}$ cm$^{-3}$. A B-NCD diamond layer doped with boron with such a concentration has a resistivity that reduces as the boron concentration increases. Thus, for a boron concentration of the order of $10^{21}$ cm$^{-3}$, the resistivity is of the order of $10^{-2}$ Ωcm at 295K, as shown in the article of Gajewski et al. entitled "*Electronic and optical properties of boron-doped nanocrystalline diamond films*", 2009, Phys. Rev. B, 79, 045206.

It should be noted that the mobility of the secondary electrons is of the same order of magnitude as that of the holes, as shown in the article of Isberg et al. entitled "*High carrier Mobility in Single-Crystal Plasma-Deposited Diamond*", 2002, Science, 297, 1670.

The B-NCD diamond layer 21 comprises an upstream face 21E receiving incident electrons coming from the photocathode 12 and a downstream face 21S emitting secondary electrons opposite to the upstream face 21E.

As described previously, the transport of the secondary electrons within the B-NCD diamond layer occurs mainly in the form of a diffusion current and not in the form of a drift current. In fact, the B-NCD diamond layer has particularly low grain sizes, which results in the formation of a dense random array of grain joints which act as diffusion zones vis-à-vis the secondary electrons. In addition, at these boron concentrations, the density of boron atoms becomes close to the density of the diamond. The boron atoms also participate in increasing the diffusion of the secondary electrons in the material.

The diffusion current mainly relates to the secondary electrons.

In fact, when incident electrons penetrate into the B-NCD diamond layer 21, electron-hole pairs are created locally, near to the upstream receiving face 21E.

The holes from the electron-hole pairs, hereinafter referred to as additional holes to distinguish them from the holes from the doping with boron, do not form an important density gradient vis-à-vis the remainder of the B-NCD diamond layer 21, in so far as the boron concentration is substantially uniform and particularly high.

However, the creation of electron-hole pairs leads to the appearance of an important density gradient of secondary electrons. Due to said density gradient, the secondary electrons scatter into zones of lower density of secondary electrons, up to the downstream emission face.

A zone of the upstream face 21E of the B-NCD diamond layer 21 is metallised to form a hole collection electrode. Said collection electrode 23 is situated at the edge of the upstream face 21E, near to the tube body.

Alternatively, the collection electrode 23 of the upstream face 21E of the B-NCD diamond layer 21 may extend over substantially the entire surface of said face 21E, and may have a wide meshed grid form.

As described previously, said collection electrode is taken to an electrical potential, and thereby forms a reservoir of electrons for the diamond layer 21. Said source of electrons supplies electrons enabling the additional holes to recombine. Thus, the diamond layer 21 has a substantially constant overall charge as it receives incident electrons and emits secondary electrons.

The B-NCD diamond layer is near to the photocathode 12, at a distance of several tens or hundreds of microns, for example 50 μm or 150 μm.

In addition, the B-NCD diamond layer 21 is arranged in contact with the MCP 22. More precisely, the downstream face 21S for emitting secondary electrons of the nanocrystalline diamond layer 21 is in contact with the upstream receiving face 22E of the MCP 22.

In order to reduce the electron affinity of the B-NCD diamond layer 21, the downstream face 21S thereof is treated with hydrogen or caesium. Thus, the secondary electrons that reach the downstream face 21S can extract themselves naturally therefrom.

The B-NCD diamond layer 21 has a thickness comprised between 0.1 μm and 10 μm. It is advantageously higher than the penetration length of the incident electrons, for example of the order of two to ten times the penetration length.

The penetration length depends on the energy of the incident electrons. As an example, incident electrons, the energy of which is 5 keV or 15 keV, penetrate into the B-NCD diamond layer 21 over a distance of around 0.25 μm or 2 μm, respectively.

Thus, the incident electrons generate electron-hole pairs essentially near to the upstream receiving face 21E. The secondary electrons thereby created scatter up to the downstream emitting face of the diamond layer 21, whereas the additional holes recombine with the electrons supplied by the collection electrode 23.

Said B-NCD diamond layer 21 is advantageously formed using known chemical vapour deposition techniques. In this way, it is possible to obtain diamond, the average grain size of which is comprised between several nanometers and several hundreds of nanometers. Grain joints, stacking defects and dislocations are present. Thus, the B-NCD diamond layer 21 has a very high density of scattering zones. This makes the mobility of the secondary electrons particularly low and increases the value of the diffusion constant. In addition, the B-NCD diamond layer 21 has a high density and thus a better mechanical strength.

The electron multiplier 20 moreover comprises a MCP 22 arranged downstream of the B-NCD diamond layer 21 and in contact therewith.

It comprises an upstream face 22E for receiving incident electrons, here the secondary electrons emitted by the B-NCD diamond layer, and a downstream face 22S for emitting secondary electrons opposite to the input surface 22E along the direction Z.

The MCP 22 is crossed by a plurality of microchannels 24 from the upstream face 22E to the downstream face 22S, such that an incident electron that penetrates into a micro-channel 24 causes the generation in cascade of a large number of secondary electrons.

More precisely, when an incident photoelectron enters into a micro-channel 24 and collides against the interior wall of the micro-channel 24, secondary electrons are generated, which, when they in turn collide against the wall, also generate other secondary electrons. The electrons are directed and accelerated by an electric field imposed between the upstream 22E and downstream 22S faces of the MCP 22, towards the output of the micro-channel 24 situated in the output surface 22S of the MCP 22. The electrons are then oriented and accelerated towards the output device 30 by an electric field.

The output device 30 is situated at a distance from the MCP 22 comprised between several tens of microns to several hundreds of microns, for example 50, 100 or 150 μm.

It comprises a face 31 for receiving secondary electrons coming from the electron multiplier 20, more precisely from the MCP 22.

It may comprise a phosphor screen 32 deposited on the internal surface 31 of an output window. The output window, for example made of glass, optically transmits the intensified luminous signal outside of the tube 1. The output window may be replaced by an optical fiber. The phosphor screen 32 is arranged parallel to the output surface 22S of the MCP 22 and facing said surface 22S such that the secondary electrons generated by the MCP 22 impact therein. The phosphor screen 32 comprises a layer of phosphor or any other material capable of emitting a photon when it receives an electron of sufficient energy.

Thus, the pattern of the incident image is reproduced by the phosphor screen 32 by the photons emitted by the excited phosphor. The photons are then transmitted to the outside of the tube 1 through the output window or an optical fiber.

Alternatively to the phosphor screen, the output device may comprise a CCD sensor or a CMOS sensor.

Electric fields are imposed between the different elements of the image intensifier tube to direct and accelerate the primary or secondary electrons. Thus, a first electric field is generated between the photocathode 12 and the upstream face 22E of the MCP 22.

The B-NCD diamond layer 21 is thus situated in an electric field generated between a first electrode situated at the level of the photocathode 12 and a second electrode situated at the level of the upstream face 22E of the MCP 22.

Said subjected electric field, normally called penetration field, may have an intensity less than 10 kV/cm, for example of the order of 10, 5, 2, 1 kV/cm, or even 0.5 kV/cm. Said intensity is not however sufficient to ensure the transport of the secondary electrons essentially by a drift current in the B-NCD diamond layer. It may thus be considered, as a first approximation, that the B-NCD diamond layer is, at all points of its volume, substantially at a same electrical potential.

It should be noted that the dielectric constant of the B-NCD diamond layer is of the order of 5.7.

The drift current potentially present in the B-NCD diamond layer remains negligible vis-à-vis the diffusion current.

A second electric field is applied between the two upstream 22E and downstream 22S faces of the MCP 22. Thus, the secondary electrons generated in the microchannels 24 of the MCP 22 are directed and accelerated towards the downstream face 22S thereof. Said second electric field may have an intensity of the order of 20 kV/cm.

Said field is generated by two electrodes situated at the level of the upstream 22E and downstream 22S faces of the MCP. Thus, a thin metal layer is arranged on the upstream face 22E of the MCP, in the form, preferably, of a wide meshed grid. Said metal layer is situated between the B-NCD diamond layer 21 and the upstream face 22E of the MCP. A second thin metal layer is arranged on the downstream face 22S of the MCP, in the form, preferably, of a wide meshed grid.

Finally, a third field is imposed between the MCP 22 and the output device 30. More precisely, the face 31 for receiving secondary electrons of the output device 30 comprises a thin metal layer, for example a wide meshed grid, taken to a potential. Said electrode cooperates with the electrode situated at the level of the downstream emitting face 22S of the MCP 22 to generate the third electric field. Thus, the secondary electrons emitted by the MCP 22 are directed and accelerated towards the output device 30. Said third electric field may have an intensity of the order of 120 kV/cm.

The different electrodes that have been described are each taken to a potential through metal elements forming in part the tube body. Each metal element of the tube body is electrically insulated from the neighbouring metal element by an element made of dielectric material, to avoid any phenomenon of short-circuit.

It should be noted that the hole collection electrode 23 may also be a polarisation electrode and thereby participate in the generation of the electric fields, preferably when it extends over the entire upstream face 21E of the B-NCD diamond layer 21.

The first electric field is then generated between the photocathode 12 and the hole collection electrode 23, or between the photocathode 12 and the B-NCD diamond layer 21 in so far as it is substantially equipotential. The value of the electrical potential of the diamond layer 21 is here that of the hole collection and polarisation electrode 23.

The second electric field is generated between the hole collection electrode 23, or the diamond layer 21, and the upstream face 22E of the MCP 22.

As previously, electric fields are also generated in the MCP 22 on the one hand, and between the MCP 22 and the output device 30 on the other hand.

The electrical potential of the hole collection electrode 23 and that of the electrode arranged on the upstream face 22E of the MCP 22 may be identical.

The operating principle of the image intensifier tube according to the first embodiment is the following.

When incident photons impact the photocathode 12 of the input device 10, this emits in response photoelectrons, known as primary photoelectrons, from its emitting face 12S.

The photoelectrons are directed and accelerated towards the B-NCD diamond layer 21 by the first electric field generated between the photocathode 12 and the MCP 22.

The primary electrons impact the upstream face 21E of the diamond layer 21 and create, therein, a large number of electron-hole pairs. The electrons created form secondary electrons.

Because of the spatial gradient of secondary electrons in the diamond layer 21, these diffuse to the downstream emitting face 21S and are emitted outside of the diamond layer. The holes generated recombine with electrons supplied by the collection electrode 23 of the upstream face 21E of the diamond layer.

The secondary electrons are directed and accelerated towards the MCP 22 by the first electric field described above. They then enter into the microchannels 24 of the MCP 22 and generate a large number of other secondary electrons. These are directed and accelerated towards the output of the microchannels 24, in other words towards the downstream face 22S of the MCP 22, by the second electric field imposed between the two faces thereof.

Said secondary electrons generated by the MCP 22 are then directed and accelerated from the MCP 22 to the output device 30 by the third electric field.

The output device 30 receives the secondary electrons of the MCP 22 and produces an intensified luminous signal in response, through the phosphor screen, CCD sensor or CMOS sensor that equips the output device.

It should be noted that the B-NCD diamond layer may be formed by a step of chemical vapour deposition, according to techniques known to those skilled in the art, and a step of doping with boron. An embodiment example is described in the article of Gajewski et al. entitled *"Electronic and optical properties of boron-doped nanocrystalline diamond films"*, 2009, Phys. Rev. B, 79, 045206.

Seeds are deposited on a quartz or monocrystalline silicon substrate under ultrasounds from a solution containing nanodiamond powder.

The diamond layer is obtained by growth from seeds by chemical vapour deposition, with a $CH_4/H_2$ plasma, the $CH_4$ concentration of which is less than or equal to 5%. The boron doping is obtained by the addition of trimethyl boron (TMB) in the phase gas, with a boron to carbon ratio up to 6600 ppm.

The substrate is then removed by chemical process, using techniques well known to those skilled in the art.

Figure 3:
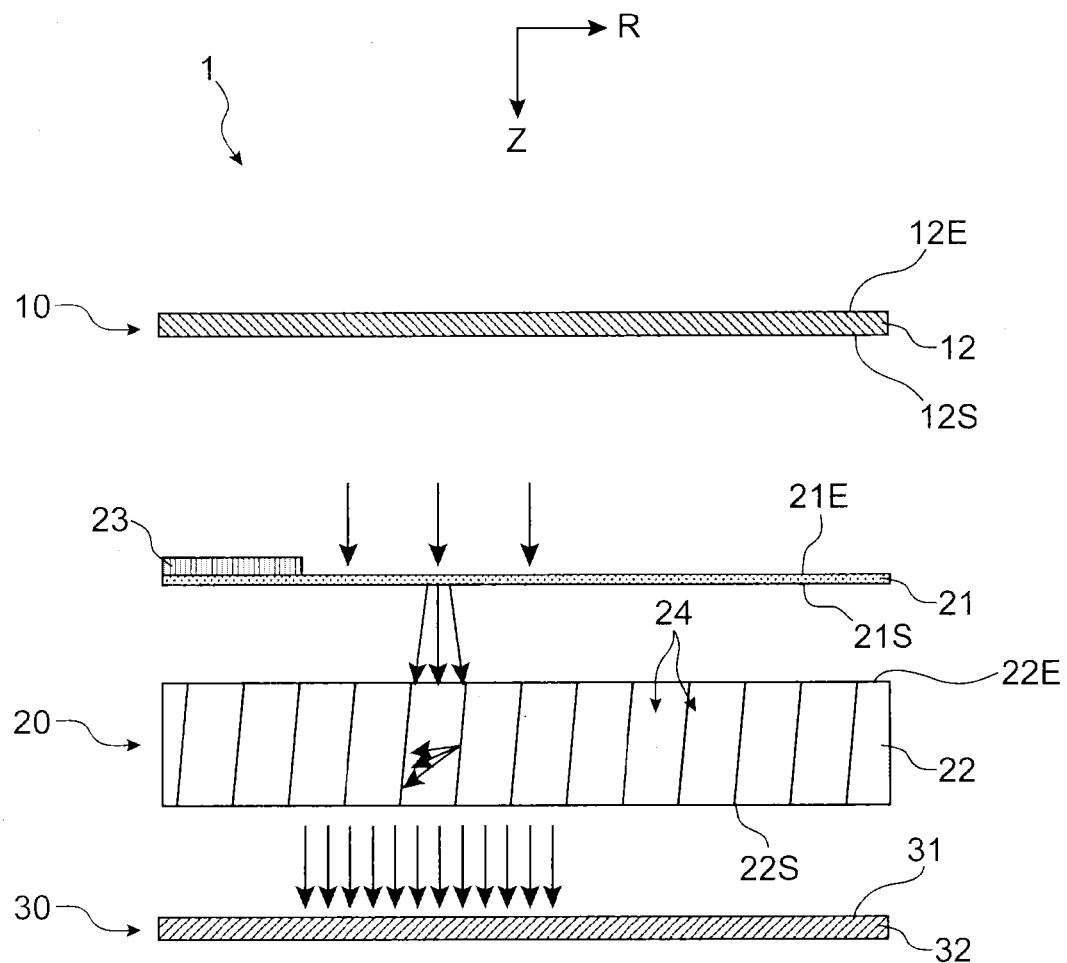
FIG. 3 is a schematic longitudinal section view of a detection system according to the invention, wherein a nanocrystalline diamond layer is arranged at short distance from a microchannel plate.

FIG. 3 is a partial and schematic view of an image intensifier tube according to a variant of the first embodiment of the invention.

Identical numerical references to those of FIG. 2 described previously designate identical or similar elements.

The image intensifier tube according to this variant differs from the first embodiment described previously in that the B-NCD diamond layer 21 is arranged at a distance from the MCP 22 comprised between several microns and several hundreds of microns, for example between 5 μm and 500 μm, and preferably between 30 μm and 500 μm, for example 50 μm.

As shown in FIG. 3, the collection electrode 23 may be arranged at the edge of the upstream face 21E of the diamond layer.

Alternatively, the collection electrode 23 of the upstream face 21E of the B-NCD diamond layer 21 may extend over substantially the entire surface of said face 21E, and may have a wide meshed grid shape.

The operation of the image intensifier tube according to this variant is similar to that of the tube described previously and is not described again here.

Figure 4:
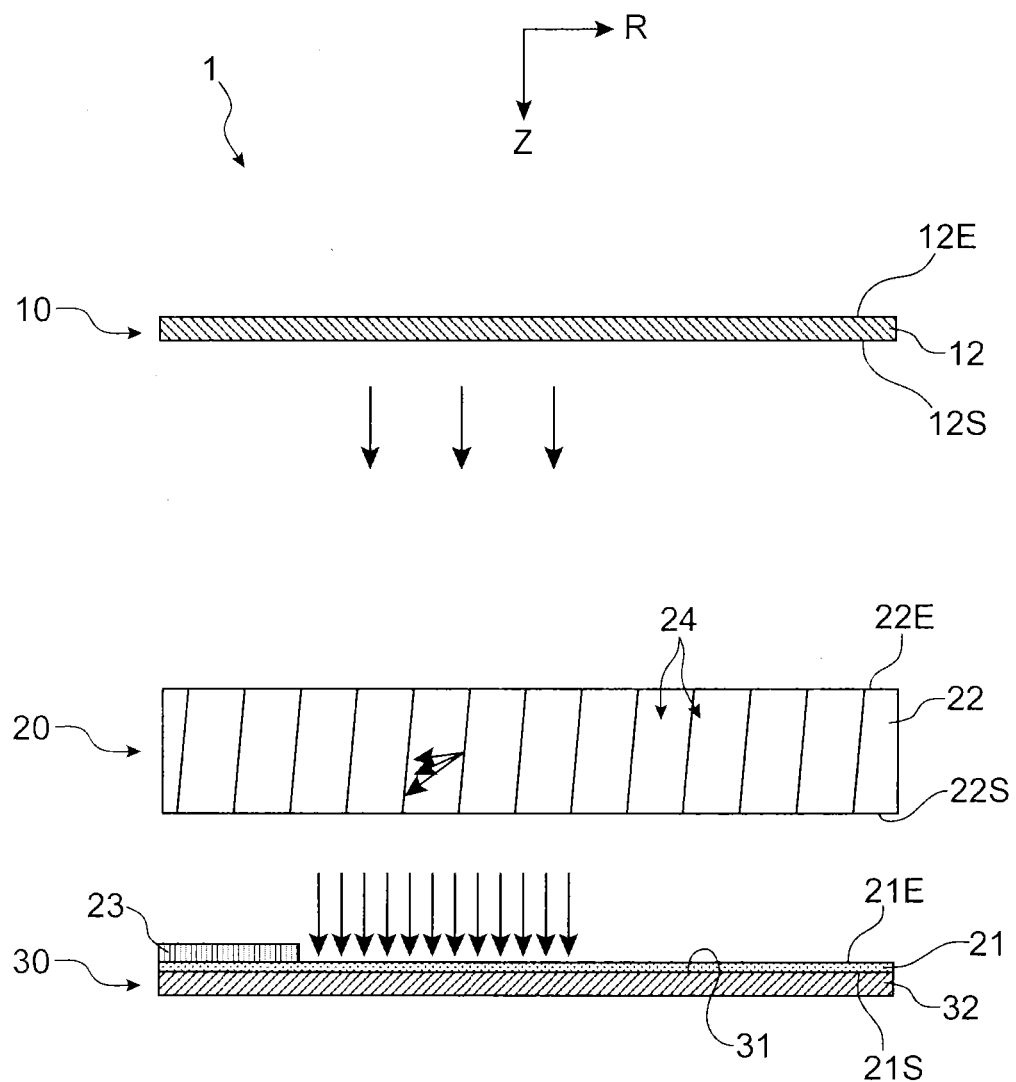
FIG. 4 is a schematic longitudinal section view of a detection system according to the invention, wherein a nanocrystalline diamond layer is arranged in contact with a phosphor screen.

FIG. 4 is a partial schematic view of an image intensifier tube according to a second embodiment of the invention.

Identical numerical references to those of FIG. 2 described previously designate identical or similar elements.

The image intensifier tube according to this embodiment differs essentially from the first embodiment described with reference to FIG. 2 in that the B-NCD diamond layer 21 is arranged between the MCP 22 and the output device 30, and in contact therewith.

It is thus not necessary to generate an electric field between the B-NCD diamond layer 21 and the output device 30.

The operation of the image intensifier tube according to this embodiment is similar to that of the tube described previously and is not described again here.

Figure 5:
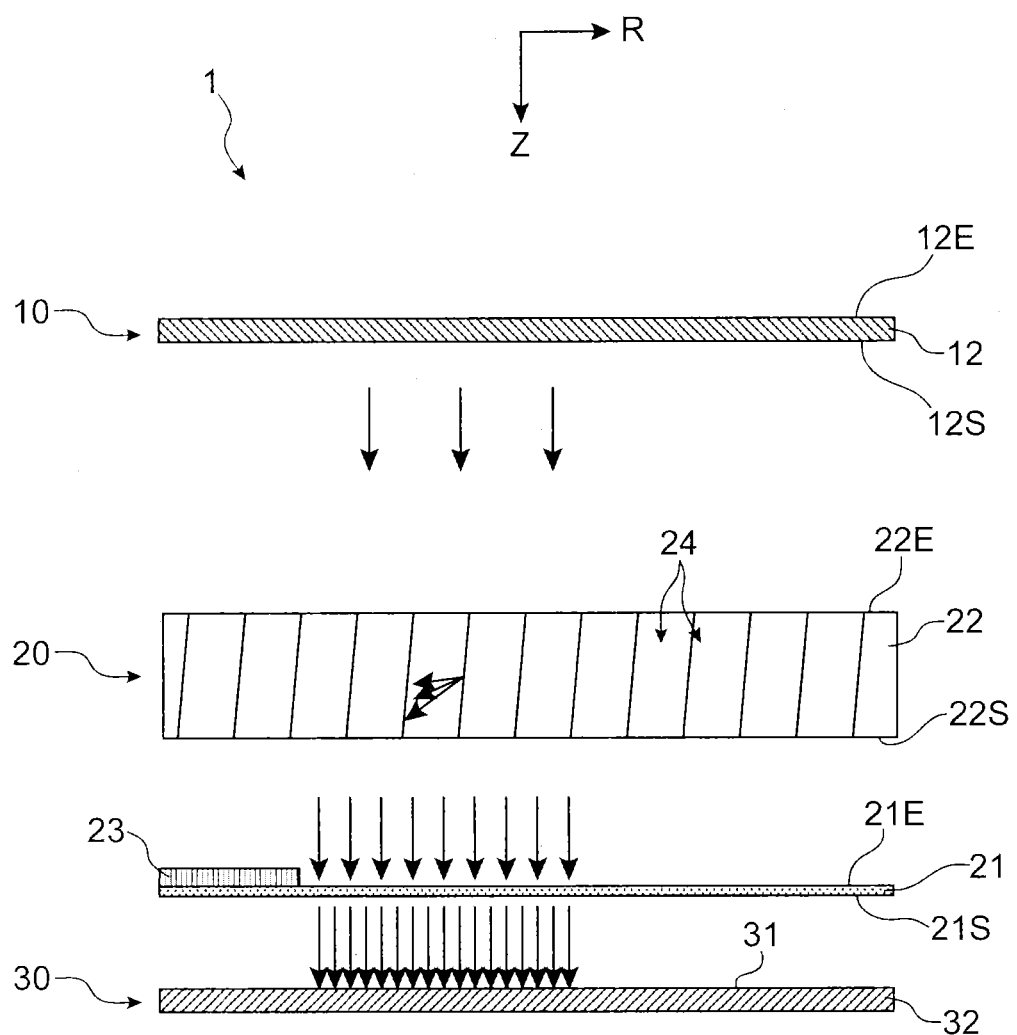
FIG. 5 is a schematic longitudinal section view of a detection system according to the invention, wherein a nanocrystalline diamond layer is arranged at short distance from a phosphor screen.

FIG. 5 is a partial schematic view of an image intensifier tube according to a variant of the second embodiment of the invention.

Identical numerical references to those of FIG. 4 described previously designate identical or similar elements.

The image intensifier tube according to this variant differs from the second embodiment described previously in that the B-NCD diamond layer 21 is arranged at a distance from the output device 30 comprised between several microns and several hundreds of microns, for example between 5 μm and 500 μm, and preferably between 30 μm and 500 μm, for example 50 μm.

As shown in FIG. 5, the collection electrode 23 may be arranged at the edge of the upstream face 21E of the diamond layer.

Alternatively, the collection electrode 23 of the upstream face 21E of the B-NCD diamond layer 21 may extend over substantially the entire surface of said face, and may have a wide meshed grid shape.

An electric field may be imposed between the B-NCD diamond layer 21 and the output device 30. The intensity of the field may be of the order of 100 kV/cm when the B-NCD diamond layer 21 and the output device 30 are spaced apart by a distance of the order of several hundreds of microns, for example 500 μm.

The B-NCD diamond layer 21 is considered as equipotential, and has an electrical potential imposed by the hole collection electrode 23, which then acts as polarisation electrode. In fact, as described previously, the electric field present inside the B-NCD diamond layer 21, known as subjected field or penetration field, is considered as negligible, such that the drift current of the secondary electrons in the diamond layers 21 is negligible compared to the diffusion current of said secondary electrons. The B-NCD diamond layer 21 may thus be considered, as a first approximation, at all points of its volume, substantially at a same electrical potential.

The operation of the image intensifier tube according to this variant is similar to that of the tube described previously and is not described again here.

Obviously, within the scope of the second embodiment and its variant, the electron multiplier may moreover comprise a second B-NCD diamond layer identical to that arranged close to the output device. Said second B-NCD diamond layer may be arranged between the photocathode and the MCP, in contact with or at a distance from the latter, as described in the first embodiment and its variant.

The photocathode is then protected against the impact of positive ions. In addition, the overall gain of the electron multiplier is increased, in so far as it comprises a MCP and two B-NCD diamond layers.

Figure 6:
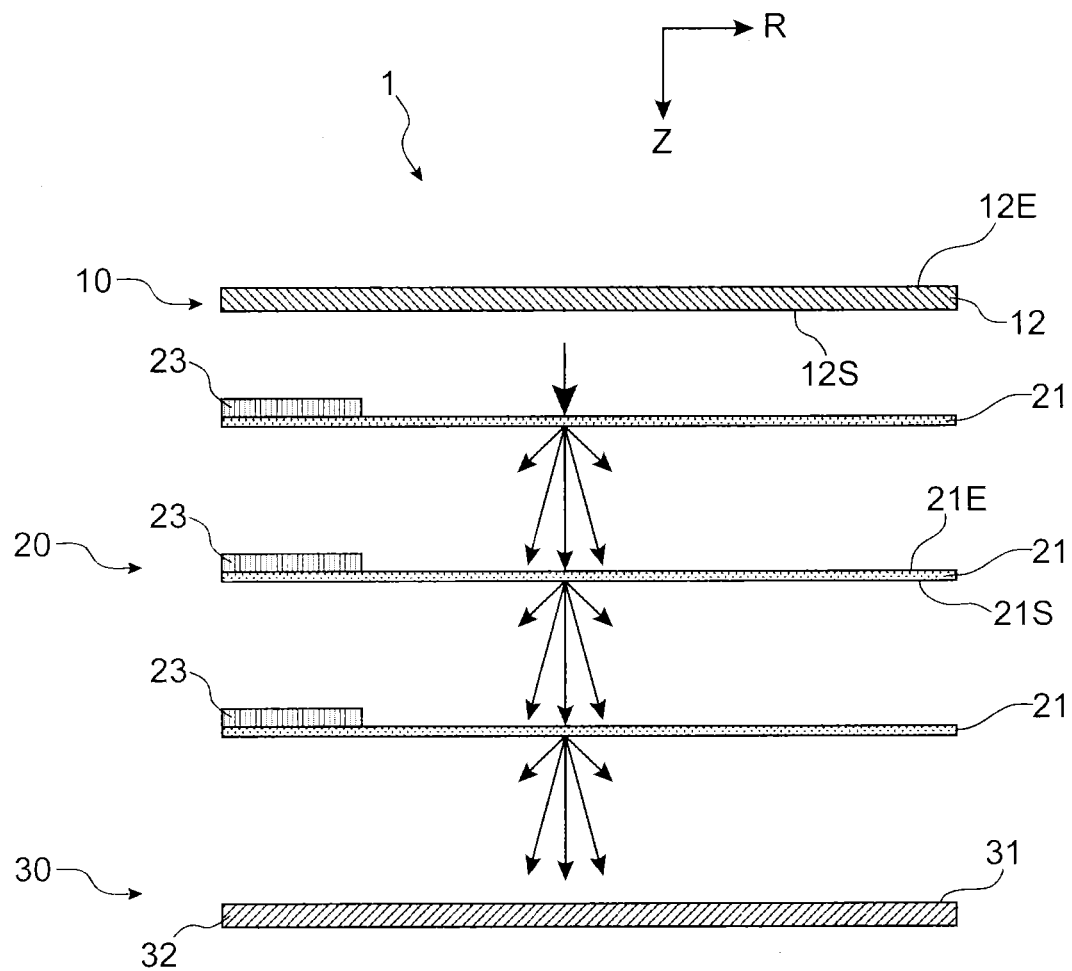
FIG. 6 is a schematic longitudinal section view of a detection system according to the invention, wherein the electron multiplier comprises a plurality of nanocrystalline diamond layers.

FIG. 6 is a partial and schematic view of an image intensifier tube according to a third embodiment.

Identical numerical references to those of FIG. 2 described previously designate identical or similar elements.

The image intensifier tube according to this variant differs from the first embodiment described previously in that the electron multiplier no longer comprises a MCP but, quite the opposite, a plurality of B-NCD diamond layers 21 arranged one on another along the Z axis of the tube and spaced apart from each other.

The diamond layers may be arranged at a distance from each other comprised between several microns and several hundreds of microns, for example between 5 µm and 500 µm, and preferably between 30 µm and 500 µm, for example 50 µm.

As shown in FIG. 6, the collection electrode 23 may be arranged at the edge of the upstream face 21E of the diamond layer.

Alternatively, the collection electrode 23 of the upstream face 21E of each B-NCD diamond layer 21 may extend over substantially the entire surface of said face, and may have a wide meshed grid shape.

An electric field is generated between a first electrode situated at the level of the photocathode 12 and a second electrode situated at the level of the output device 30.

Alternatively, electric fields may be imposed, respectively, between the photocathode 12 and the first B-NCD diamond layer 21, between said B-NCD diamond layers 21, and between the final B-NCD diamond layer 21 and the output device 30. The intensity of the electric field between the photocathode 12 and the first B-NCD diamond layer 21 may be of the order of 20 kV/cm, and the intensity of the electric field between the final B-NCD diamond layer 21 and the output device 30 may be of the order of 100 kV/cm.

The B-NCD diamond layers 21 are considered as equipotential, and have an electrical potential imposed by their respective hole collection electrode 23, which then acts as polarisation electrode.

The electric field present inside each B-NCD diamond layer 21 is considered as negligible, such that the drift current of the secondary electrons in the diamond layers 21 is negligible compared to the diffusion current of said secondary electrons. Each B-NCD diamond layer 21 is considered, as a first approximation, at all points of its volume, substantially at a same electrical potential.

The operation of the image intensifier tube according to this variant is similar to that of the tube described previously and is not described again here.

As has been mentioned previously, the invention is not limited to image intensifier tubes.

The detection system may thus be a photomultiplier tube. The input device may be identical or similar to that described previously. On the other hand, the output device is different and comprises a single anode or a plurality of anodes. The electron multiplier is identical to that described previously with reference to FIGS. 2 to 6.

The detection system may also be a tube for detecting ion flow. The input device comprises a photoemissive layer sensitive to the ion flow for emitting so-called primary electrons in response. The output device may comprise, as for the photomultiplier tube, a single anode or a plurality of anodes. The electron multiplier is identical to that described previously with reference to FIGS. 2 to 6.

Obviously, various modifications may be made by those skilled in the art to the invention that has been described, uniquely by way of non-limiting examples.

The invention claimed is:

1. A system for detecting an electromagnetic radiation or an ion flow, comprising:
   an input device, for receiving the radiation or an ion flow and emitting primary electrons in response;
   a multiplier of electrons in transmission for receiving the primary electrons and emitting secondary electrons in response; and
   an output device, for receiving the secondary electrons and emitting an output signal in response,
   wherein the electron multiplier comprises at least one nanocrystalline diamond layer doped with boron in a concentration of higher than $5 \cdot 10^{19}$ cm$^{-3}$.

2. A detection system according to claim 1, wherein the nanocrystalline diamond layer has a boron doping concentration higher than $2 \cdot 10^{20}$ cm$^{31\ 3}$.

3. A detection system according to claim 1, wherein the thickness of the nanocrystalline diamond layer is between 0.1 µm and 10 µm.

4. A detection system according to claim 1, wherein the nanocrystalline diamond layer is formed by chemical vapour deposition.

5. A detection system according to claim 1, wherein the nanocrystalline diamond layer comprises an upstream face for receiving incident electrons, and a downstream face for emitting secondary electrons in response, the upstream face comprising a hole collection electrode configured to be taken to an electrical potential.

6. A detection system according to claim 5, wherein the collection electrode is situated at an edge of the upstream face, or extends substantially over an entire upstream face.

7. A detection system according to claim 1, wherein an electric field, present inside the nanocrystalline diamond layer, is less than or equal to 10 kV/cm.

8. A detection system according to claim 1, wherein the nanocrystalline diamond layer has a downstream face to emit secondary electrons, the downstream face being treated with hydrogen or with caesium to reduce its electron affinity.

9. A detection system according to claim 1, wherein the electron multiplier further comprises a microchannel plate arranged downstream of the nanocrystalline diamond layer along a general direction of propagation of the electrons.

10. A detection system according to claim 9, wherein the nanocrystalline diamond layer is arranged in contact with the microchannel plate, or is arranged at a distance therefrom between 5 µm and 500 µm.

11. A detection system according to claim 1, wherein the output device comprises a face for receiving secondary electrons, the nanocrystalline diamond layer being arranged in contact with the receiving face of the output device, or is arranged at a distance therefrom between 5 µm and 500 µm.

12. A detection system according to claim 1, wherein the electron multiplier comprises a plurality of the nanocrystalline diamond layers arranged one on the other along a general direction of propagation of the electrons, and spaced apart from each other.

13. A detection system according to claim 1, wherein the detection system is a photomultiplier tube, the output device comprising at least one anode.

14. A detection system according to claim 1, wherein the detection system is a photomultiplier tube or image intensifier, the input device comprising a photocathode formed of $SbK_2Cs$ or GaAs.

15. A detection system according to claim 1, wherein the detection system is an image intensifier tube, the output device comprising a phosphor screen, a CCD sensor, or a CMOS sensor.

16. A detection system according to claim 1, wherein the detection system is a tube for detecting an ion flow, the output device comprising at least one anode.

* * * * *